United States Patent [19]

Long et al.

[11] 4,049,411

[45] Sept. 20, 1977

[54] FORMING LEVEL AIR CONDITIONING SYSTEM

[75] Inventors: David M. Long, Pittsburgh, Pa.; Joseph B. Dent, Jr., Lexington, N.C.

[73] Assignee: PPG Industries, Inc., Pittsburgh, Pa.

[21] Appl. No.: 707,985

[22] Filed: July 23, 1976

[51] Int. Cl.² .......................................... C03B 37/02
[52] U.S. Cl. ...................... 65/2; 65/11 W; 65/12
[58] Field of Search .................. 65/2, 11 W, 12, 5, 16, 65/3 R

[56] References Cited

U.S. PATENT DOCUMENTS

| | | | |
|---|---|---|---|
| 3,271,122 | 9/1966 | Denniston et al. | 65/12 X |
| 3,304,163 | 2/1967 | Holschlag | 65/12 X |
| 3,558,293 | 1/1971 | Zurheide | 65/12 X |
| 3,697,241 | 10/1972 | Strickland et al. | 65/12 X |
| 3,969,099 | 7/1976 | Reese | 65/12 X |

Primary Examiner—Robert L. Lindsay, Jr.
Attorney, Agent, or Firm—Alan T. McDonald; John E. Curley

[57] ABSTRACT

An improved method and apparatus for the formation of glass fiber strands is disclosed. One aspect of the invention includes isolating the filament formation level of a double level glass strand forming and collecting operation by creating a positive air pressure in the room containing the filament and strand formation region such that only directed conditioned air enters the room. Due to the net positive air pressure within this room, air flows from the room through any openings rather than air entering the room from the openings. In a second aspect of the invention, conditioned air is directed to each filament forming bushing horizontally at a desired flow rate to help maintain a consistent environment around the bushing and thus improve filament formation.

15 Claims, 1 Drawing Figure

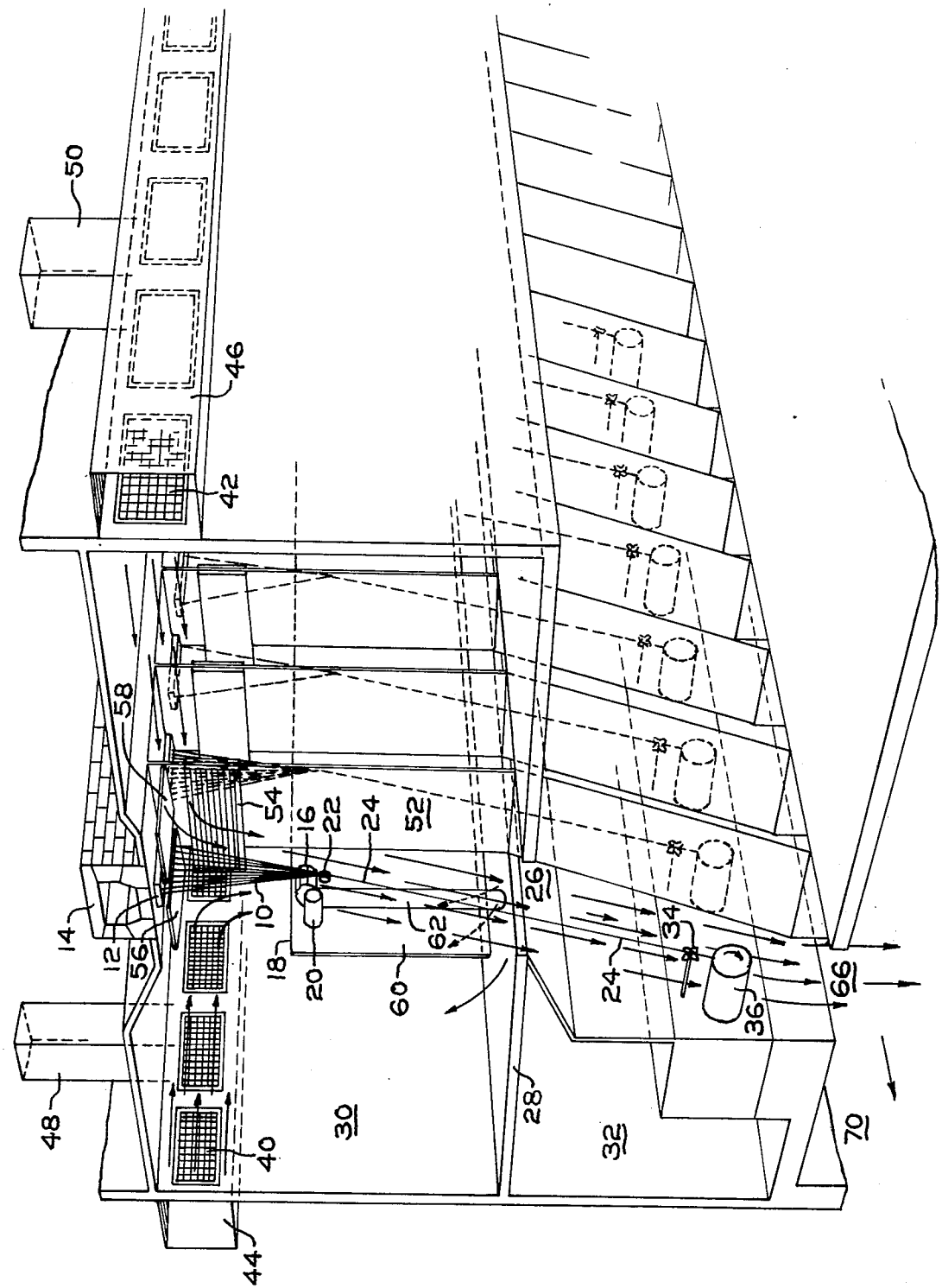

FORMING LEVEL AIR CONDITIONING SYSTEM

BACKGROUND OF THE INVENTION

Glass fiber strands are typically formed by attenuating glass filaments through bushing tips or orifices at the bottom of a heated bushing containing molten glass. The filaments are then passed across the application surface of an applicator where they are coated with a binder and/or size. The filaments are then passed within the groove of a gathering shoe, which is typically a grooved wheel or cylinder formed of a material such as graphite, where the filaments are combined into one or more unified strands. The strand or strands are then collected on a rotating drum or collet as a forming package.

In the past, it has been found advantageous to form the filaments and strand on a first forming level and to collect the thus formed strand on a second forming level. This double level operation has improved the quality of strand produced.

However, a major problem in the formation of quality glass strand remains in controlling the environment at and directly below the bushing. It is well-known that as the filaments are attenuated through the bushing at high speeds, typically ranging from about 2,000 to 20,000 feet per minute (609.6 to 6096 meters per minute), that air is aspirated downwardly with the filaments, thus producing a shortage of air at the bushing. This results in turbulent air flow in the area around the bushing as new air attempts to replace that air which has been lost by withdrawal from the bushing area with the attenuated filaments. The turbulent air flow around the bushing results in uneven air flow and thus uneven temperature conditions at the bushing. This combination results in uneven filament diameters being formed and even filament breakouts occurring, the filament diameters being directly affected by any viscosity change in the molten glass which itself is dependent upon any change in temperature. If the turbulence becomes severe enough, breakouts of the filaments can also occur from the air currents alone.

It is thus a primary objective of the present invention to provide for a more uniform flow of air in the region surrounding the bushing to thus improve both the air flow and temperature environments which are critical to the glass filament formation.

In U.S. Pat. No. 3,304,163, it has been suggested to locate air conditioning ducts on either side of the bushing and slightly spaced from it. These ducts direct air downwardly with the filaments as they are being formed. While this does increase the air supply in the region around the bushing, it does not provide for the non-turbulent air flow at the bushing which is desired.

THE PRESENT INVENTION

By means of the present invention, a more uniform air flow in the region of the bushing is obtained. In the first aspect of the present invention, the filament formation level of a double level glass fiber strand forming and collecting operation is subjected to a positive air pressure such that any openings in the room containing the filament formation region will not permit extraneous air to enter the room, but will permit only air to flow from the room to the outside. This enables control of the incoming air to the filament formation region.

According to the second apsect of the present invention, conditioned air, which is now the only air permitted to enter the room, is provided to the room horizontally from a pair of air-conditioning grills. These grills are located on opposite sides of the room, in front of and behind the bushing. These grills have their vertical and horizontal center lines approximately even with the horizontal and vertical center lines of the bushing. The air flow through these grills is controlled by louvers, deflectors and the like to provide a constant and laminar flow of air to the bushing from both the front and the rear of the bushing. This air replaces the air which is being drawn downwardly with the filaments and is sufficient to maintain a constant and laminar flow of air at the bushing and thus prevent turbulence in the bushing environment. In addition, this helps maintain a more uniform temperature environment below the bushing and results in the production of more uniform glass filaments and reduced filament breakouts.

The glass fiber formation system of the present invention includes a separate pair of air grills for each forming position bushing. Both the front and rear grills at each forming position may be individually controlled to increase or decrease the air flow from that grill to its bushing in order to balance the air flow at each position. This is important, since various sized bushings may require different air flow rates and since the positions of necessary equipment adjacent to the bushing may required different air flow rates fom the front and rear air grills of a given bushing to maintain a uniform flow rate at the front and rear of the bushing. Thus, this system allows for the operation of various glass fiber bushings on a single glass melting tank with individual air controls over each of them so that each bushing may operate to its maximum potential.

BRIEF DESCRIPTION OF THE DRAWING

The glass fiber forming system of the present invention will be more fully described with reference to the drawing which is a perspective view of a double-level glass fiber forming operation including the air flow system of the present invention.

DETAILED DESCRIPTION OF THE DRAWING

Turning to the FIGURE, it will be readily realized that each forming position is similar in its design and organization. Thus, only a single postion will be described, with it being understood that the description will suffice for the balance of the positions.

Glass filaments 10 are attenuated from bushing tips located at the bottom of a heated bushing 12. The bushing 12 is connected to the forehearth 14 of a glass furnace (not shown) through which molten glass is supplied to the bushing 12. The filaments 10 pass across the application surface 16 of an applicator 18. As illustrated, the applicator 18 is a roller applicator with the roller 16 being rotated by a motor 20. While the applicator 18 is illustrated as a roller applicator, it is obvious that the applicator 18 could be a belt applicator, pad applicator or the like. Filaments 10 then pass across the face of a gathering shoe 22 where they are combined into a unified strand 24. The strand 24 passes through an opening 26 in the floor 28 of the filament and strand formation level 30 and to the collection level 32. The strand 24 then passes across the face of a rotating spiral 34 wherein it is traversed and collected as a forming package on the winder 36.

The present invention concerns the filaments at the forming level 30. The bushing 12 is supplied air from a pair of grills 40 and 42. Grill 40 is connected to an air transport supply duct 44 and grill 42 is connected to a supply duct 46. These ducts are supplied with conditioned air from ducts 48 and 50, respectively. The conditioned air is preferably at a temperature of between about 55° and 65° F. (12.8° and 18.3° C.) and at a relative humidity of 70 to 100 percent. Most preferably, the conditioned air is at a temperature of 60° F. (15.6° C.) and at a relative humidity of about 85 percent.

The air flow from the grill 40 and grill 42 is adjusted such that the velocity of the air at the bushing from both the front and rear of the bushing is between about 50 and 150 feet per minute (15.24 and 45.72 meters per minutes), preferably between 50 and 100 feet per minute (15.24 and 22.86 meters per minute). To accomplish this result, the velocity at the grills 40 and 42 is approximately 200 to 500 feet per minute (60.9 and 152.3 meters per minute) and preferably about 300 to 400 feet per minute (91.4 and 121.9 meters per minute). These velocities may be equal from both the front and rear grills 40 and 42. However, typically the velocity is somewhat higher from the rear grill 40, since equipment necessary to the operation of the bushing, such as electric bus bars, transformers and the like (not shown), are located in this area. The velocity of 50 to 150 feet per minute (15.24 and 45.72 meters per minute) reaching the bushing both from the front and rear produces laminar flow at the bushing rather than the turbulent flow typically encountered in the past. Typically, flow rates of the air entering from grills 40 and 42 are in the order of 300 to 400 cubic feet per minute (8.5 to 11.3 cubic meters per minute) with slightly more total air typically being released from the front grill 42, to aid in the comfort of the operator working on the forming level.

Due to the damp conditions at the bushing, both from the applicator 18 and from the cooling pre-pad sprays (not shown) directly below the bushing 12, the relative humidity at the bushing 12 is approximately 100 percent, a saturated condition.

The forming positions are separated from one another by separator plates 52. Connected to these plates are cooling panels 54. The cooling panels 54 are more fully described in concurrently filed application Ser. No. 707,986 of Joseph B. Dent, Jr., Howard M. Bennett and Walter L. Martin, which is incorporated herein by reference. As described in this copending application, a cooling panel 54 is located on each side of the bushing 12 and below it. This panel provides cooling to the environment below the bushing from the sides of the bushing 12 and helps to maintain a more uniform temperature environment therein. In addition, this panel is connected to cooling plates 56 and 58, as well as to the fin coolers used in cooling the tips of the bushing, the terminal clamps for supplying electricity to the bushing 12, and other equipment requiring cooling, such as a cooling ring embedded in the refractory surrounding the metal bushing (all not shown). As disclosed in the aforementioned copending application, this reduces the clutter common in the bushing region and has aided in opening up the region surrounding the bushing, which has helped in allowing for a more uniform air flow at the bushing, such that the desired air flows of the present invention may be realized.

The air flowing from the grills 40 and 42 reaches the bushing 12, as previously mentioned, in laminar flow from both the front and the rear. As the air reaches the bushing, it is aspirated downwardly with the filaments 10 and the majority of the air passes through the opening 26 to the collecting level 32. Some of the air strikes the floor 28. In the past, this air has "bounced" off the floor 28 and back up into the bushing area, again creating a turbulent flow. However, a plate 60 is provided which is connected to a strand 62 for the applicator 18. This plates has an opening or vent at its bottom which allows the air "bouncing" off the floor 28 to escape through the opening to be recirculated. This plate and its operation is more fully described in concurrently filed application Ser. No. 707,967 of Joseph B. Dent, Jr., which is also incorporated herein by reference.

The air flowing through the opening 26 passes downwardly with the strand 24 to the collet 36. Collet 36 is rotating in a clockwise direction which produces a negative air pressure to its right and forces the air along its right and through the waste chute 66 to the waste collection area 70 which is connected to the recirculation system for the conditioned air (not shown).

As previously mentioned, the filament and strand formation region is designed such that extraneous air does not enter the system. The air flowing through the grills 40 and 42 is in a sufficient quantity to produce a positive air pressure within the room containing the filament and strand forming equipment. This positive air pressure is slight, being about 0.05 to 0.075 pounds per square inch (340.1 to 510.2 pascals) above atmospheric pressure, however, it is sufficient to exclude extraneous air from the fiber forming room. Due to the positive air pressure, air cannot enter the fiber forming room from openings such as doors on the end of the room, the opening 26 between the room 30 and the strand collection region 32, and the like. Thus, air will flow from filament formation region 30 through these openings to the other region and consequently only the conditioned air through the grills 40 and 42 reaches the bushing region.

EXAMPLE

DE-150 bushings having 400 orifices each were operated for a period of 35 days at a speed of approximately 14,000 feet per minute (4263 meters per minute). The bushings were operated in an enclosed air pressurized forming region having conditioned air from grills 40 and 42 flowing horizontally across the bushing at a velocity of approximately 50 feet per minute (15.4 meters per minute). The bushings are designed to wet pull 36.9 pounds of glass per hour (16.7 kilograms per hour) when operating efficiently.

During the 35 day span,, the bushings averaged 37.0 pounds per hour (16.8 kilograms per hour), a 100.3 percent job efficiency. During this time period, the percentage of calldowns, i.e., the percentage of complete forming packages produced without strand breakage was 63.8 percent.

In comparison, identical DE-150 bushings were operated during the same time period at the same rate on another double-level forming operation without the air flow system of the present invention. During the 35 day period, the average wet pull per hour for these bushings was 30.7 pounds per hour (13.9 kilograms per hour). This converts to a job efficiency of 83.1 percent. During this same time period, the percentage of calldowns was 33.9 percent.

Thus, the tank employing the present invention showed an increase in both the amount of glass produced and the amount of packages formed without a breakage occurring. This illustrates the improvement in the quality of glass strand produced by the employment of the present invention.

While this invention has been described with reference to a specific embodiment thereof, it is not intended to be so limited thereby except as set forth in the accompanying claims.

We claim:

1. In an apparatus for forming glass fibers comprising a bushing for supplying streams of molten glass and means for attenuating and collecting said streams as continuous fibers, the improvement comprising means for supplying conditioned air continuously to said bushing, said means being located at a level with said bushing and perpendicular to said bushing to thereby direct substantially all of said conditioned air in a horizontal direction from opposing sides of said bushing, said air being directed in sufficient amount and at sufficient velocity to produce a net positive air pressure in an area containing said bushing, while providing a substantial flow of conditioned air to said bushing at the tips of the bushing on opposing sides at a velocity of between about 50 and 150 feet per minute (15.24 and 45.72 meters per minute) and means for venting the air to a zone having a lower pressure.

2. The apparatus of claim 1 wherein the means for supplying comprises an air-conditioning system having grills with their center lines located approximately level with the center lines of said bushing both in front of and behind the bushing.

3. The apparatus of claim 1 further comprising means for adjusting the amount of air supplied to said bushing from opposing sides of said bushing separately.

4. The apparatus of claim 2 wherein a plurality of bushings are supplied from a common air-conditioning supply system.

5. The apparatus of claim 1 further comprising means for sealing the region containing said bushing such that a positive air pressure is created in said area.

6. In a method of forming glass fibers comprising attenuating glass streams into fibers through a bushing and collecting the resulting fibers, the improvement comprising directing conditioned air to said bushing from opposing sides of said bushing at a level with said bushing and perpendicular to said bushing, to thereby direct substantially all of said conditioned air in a horizontal direction, said air being directed in sufficient amount and at sufficient velocity to produce a net positive air pressure in an area containing said bushing while providing flow of conditioned air to said bushing at the tips of bushing on opposing sides thereof at velocities of between about 50 and 150 feet per minute (15.24 and 45.72 meters per minute), and venting the air to a zone having a lower pressure.

7. The method of claim 6 further comprising adjusting the amount of air supplied to said bushing from at least one of the opposite sides of said bushing.

8. The method of claim 6 wherein conditioned air is directed to a plurality of bushings from a common supply source.

9. The method of claim 6 wherein said positive air pressure in the area surrounding the bushing is sufficient to prevent extraneous air from entering the area.

10. In a method of forming glass fibers comprising attenuating glass streams into fibers from a bushing containing molten glass and collecting the resulting fibers in strand form and wherein the bushing is positioned in a first room located above a second room wherein the strand is collected, the improvement comprising supplying air to an air transport duct at a temperature of between about 55° and about 65° F. (12.8° and 18.3° C.) at a relative humidity of about 70 to about 100 percent, forcing air from the air transport duct through a plurality of grills, said grills being positioned on opposing sides of each bushing and perpendicular to each bushing in said first room, directing substantially all of the air from each of said grills horizontally across the room to said bushing opposite said grills at a velocity of between about 200 to 500 feet per minute (60.9 to 152.3 meters per minute) to provide at each of the bushings on opposing sides thereof air at velocities of about 50 to about 150 feet per minute (15.2 to 46.7 meters per minute), establishing in said first room a positive pressure of about 0.05 to about 0.075 pounds per square inch (340.1 to 510.2 pascals) with respect to said second room and directing the conditioned air as it reaches each said bushing downwardly with the fibers being attenuated and into said second room.

11. The method of claim 10 wherein said air temperature is 60° F. (15.6° C.).

12. The method of claim 11 wherein said relative humidity is about 85 percent.

13. The method of claim 10 wherein said velocity of air at said grills is between 300 and 400 feet per minute (91.4 and 121.9 meters per minute).

14. The method of claim 10 wherein said velocity of air at each bushing is about 50 to 100 feet per minute (15.24 to 22.86 meters per minute).

15. The method of claim 14 wherein said velocity of air at each bushing is 50 feet per minute (15.24 meters per minute).

* * * * *

UNITED STATES PATENT AND TRADEMARK OFFICE
CERTIFICATE OF CORRECTION

PATENT NO. : 4,049,411
DATED : September 20, 1977
INVENTOR(S) : David M. Long and Joseph B. Dent, Jr.

It is certified that error appears in the above-identified patent and that said Letters Patent are hereby corrected as shown below:

Column 1, line 23, "strand" should be --strands--.

Column 2, line 27, "required" should be --require--.

Column 2, line 27, "fom" should be --from--.

Column 3, line 13, "minutes" should be --minute--.

Column 4, line 4, "strand" should be --stand--.

Column 4, line 5, "plates" should be --plate--.

Column 6, line 33, "340.1" should be --34.01--.

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*